United States Patent
Murai et al.

(10) Patent No.: US 11,387,745 B2
(45) Date of Patent: Jul. 12, 2022

(54) RECTIFIER AND MOTOR CONTROL APPARATUS HAVING POWER REGENERATION FUNCTION

(71) Applicant: Fanuc Corporation, Yamanashi (JP)

(72) Inventors: Eijun Murai, Yamanashi (JP); Shunpei Tanaka, Yamanashi (JP); Shinichi Horikoshi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 17/114,704

(22) Filed: Dec. 8, 2020

(65) Prior Publication Data

US 2021/0175818 A1 Jun. 10, 2021

(30) Foreign Application Priority Data

Dec. 9, 2019 (JP) .............................. JP2019-222098

(51) Int. Cl.
 *H02P 27/08* (2006.01)
 *H02P 27/06* (2006.01)
 *H02M 7/219* (2006.01)

(52) U.S. Cl.
 CPC ............ *H02M 7/219* (2013.01); *H02P 27/08* (2013.01)

(58) Field of Classification Search
 CPC ...... H02P 27/08; H02P 27/06; H02P 2201/03; H02M 5/4585; H02M 7/2195; H02M 7/527
 See application file for complete search history.

(56) References Cited

U.S. PATENT DOCUMENTS

| 4,328,454 | A | * | 5/1982 | Okuyama | ............... | H02P 23/06 318/803 |
| 8,766,477 | B2 | * | 7/2014 | Hartwig | .................... | B60L 7/06 307/73 |
| 2011/0175557 | A1 | * | 7/2011 | Iwashita | ................. | H02P 23/06 318/400.3 |
| 2012/0056568 | A1 | * | 3/2012 | Kuroki | .................... | H02P 23/20 318/400.3 |
| 2012/0068636 | A1 | * | 3/2012 | Iwashita | ................. | H02P 6/085 318/376 |
| 2016/0049895 | A1 | * | 2/2016 | Niwa | ..................... | H02P 27/08 318/400.3 |

(Continued)

FOREIGN PATENT DOCUMENTS

| JP | 11289794 | A | * | 10/1999 |
| JP | 2004180427 | A | | 6/2004 |

(Continued)

*Primary Examiner* — Thai T Dinh
(74) *Attorney, Agent, or Firm* — RatnerPrestia

(57) ABSTRACT

The rectifier includes: a main circuit unit configured to perform power conversion between AC power on a side of a three-phase AC power supply and DC power on a DC side by rectifying operation of a rectifying device and ON-OFF operation of a switching device; a power calculation unit configured to calculate a value of a power flowing between the side of the three-phase AC power supply and the DC side via the main circuit unit; and a control unit configured to perform control to execute the ON-OFF operation of the switching device, wherein the control unit changes a length of an ON period per cycle in the ON-OFF operation executed on the switching device according to the value of the power calculated by the power calculation unit.

8 Claims, 9 Drawing Sheets

(56) References Cited

U.S. PATENT DOCUMENTS

| | | | | |
|---|---|---|---|---|
| 2018/0198396 A1* | 7/2018 | Hayashi | ............... | H02P 29/027 |
| 2019/0260300 A1* | 8/2019 | Horikoshi | ............. | H02P 29/024 |

FOREIGN PATENT DOCUMENTS

| | | | |
|---|---|---|---|
| JP | 2010022187 | A | 1/2010 |
| JP | 2011151918 | A | 8/2011 |
| JP | 2013165600 | A | 8/2013 |
| JP | 2017042016 | A | 2/2017 |
| JP | 2017184365 | A | 10/2017 |

* cited by examiner

RECTIFIER AND MOTOR CONTROL APPARATUS HAVING POWER REGENERATION FUNCTION

CROSS-REFERENCE TO RELATED APPLICATIONS

This application is a new U.S. Patent Application that claims benefit of Japanese Patent Application No. 2019-222098, filed Dec. 9, 2019, the disclosure of which is incorporated herein by reference in its entirety for all purposes.

BACKGROUND OF THE INVENTION

1. Field of the Invention

The present invention relates to a rectifier and a motor control apparatus having a power regeneration function.

2. Description of the Related Art

In motor control apparatuses for the drive control of motors in machine tools, forging machinery, injection molding machines, industrial machinery, or various robots, AC power supplied from a three-phase AC power supply is converted by a rectifier to DC power, which is outputted to a DC link, and DC power in the DC link is converted by an inverter to AC power, which is supplied to a motor as the power for controlling the motor. A "DC link" is a part of the circuit that electrically connects the DC output side of the rectifier and the Dr input side of the inverter, and it is also referred to as a "DC link unit", "direct current link", "direct current link unit", "direct current bus bar", or "direct current intermediate circuit".

As rectifiers in motor control apparatuses, 120-degree conduction mode rectifiers, which can return the regenerative power which is generated during motor deceleration to the three-phase AC power supply side, are widely used. A 120-degree conduction mode rectifier n includes a three-phase bridge circuit of which the upper arm and the lower arm for each phase of the three phases are each provided with a power device that includes a rectifying device and a switching device. A 120-degree conduction mode rectifier detects the phases of the three-phase AC power supply and converts DC power to AC power by, with changes in the phase voltages of the three-phase AC power supply, turning on the switching device on the upper arm for a phase in which the voltage is the greatest of the phases of the three-phase AC power supply and turning on the switching device on the lower arm for a phase in which the voltage is the smallest of the phases of the three-phase AC power supply, and returns the AC power to the three-phase AC power supply. Here, "degree" in "120 degrees" is a unit for measuring phase angles of a three-phase voltage or a three-phase current.

For example, Japanese Unexamined Patent Publication No. 2017-042016 discloses a motor control apparatus including: a converter configured to convert DC power to AC power and to return the AC power to an AC power supply; a 120-degree conduction regenerative power control unit configured to control the converter using a 120-degree conduction method so that the power recovered through the converter is returned to the AC power supply; a PWM regenerative power control unit configured to control the converter using a PWM control method so that, the power recovered through the converter is returned to the AC power supply; an input voltage detection unit configured to detect a supply voltage being supplied from the AC power supply to the converter; a DC link voltage detection unit configured to detect a DC link voltage which is an output voltage of the converter; and a regenerative method switching unit configured to, during power regeneration, perform switching between the 120-degree conduction method and the PWM control method in accordance with a given criterion, based on a voltage value detected by the DC link voltage detection unit.

For example, Japanese Unexamined Patent Publication No. 2010-022187 discloses A method for setting a feedback power of a converter (10) clocked at a fundamental frequency on a power supply side and having a bridge circuit equipped with controllable semiconductor switches (T1, T2, 73, T4, T5, T6), the method including the steps of: clocking the semiconductor switches (T1 to T6) at the fundamental frequency in dependence of a desired direction of a power flow via the bridge circuit; and deriving drive signals (30) for the semiconductor switches (T1 to T6) from clock pulses at the fundamental frequency and a switch-on delay dependent on a system variable (10) of the converter, wherein the switch-on delay is determined from a predetermined or predeterminable characteristic curve ($\phi 1$) that depends on in each system variables.

For example, Japanese Unexamined Patent Publication No. 2013-165600 discloses a three-phase converter apparatus including: a power conversion unit configured to reversibly convert AC power from a three-phase AC power supply to DC power; phase detection means for detecting voltage phases of the three-phase AC power supply; current detection means for detecting a three-phase AC current flowing between the three-phase AC power supply and the power conversion unit; and DC voltage detection means for detecting a DC voltage on an output side of the power conversion unit, wherein the power conversion unit includes three arms respectively for phases of the three-phase AC power supply, each arm having sets of a rectifying device and a switching device in reverse-parallel connection with the rectifying device, the sets being connected in series, the three-phase converter apparatus further including a control signal output means for outputting a control signal to ON-OFF control the switching devices of each of the arms, based on the voltage phase detected by the phase detection means in a regeneration mode in which the DC power is returned to the three-phase AC power supply side, wherein the control signal output means is configured, in the regeneration mode, to identify a phase at a greatest voltage and a phase at a smallest voltage with changes in phase voltages, based on the voltage phases of the three-phase AC power supply detected by the phase detection means, to set a standard control signal for which an ON-operation time is set in such a way as to turn on both the switching device of the upper arm connected to the phase at the greatest voltage and the switching device of the lower arm connected to the phase at the smallest voltage among the three upper arms and the three lower arms, to calculate a DC current amount, based on the three-phase AC current detected by the current detection means and to set at OFF-operation time according to the DC current amount, and to output a corrected ON-control signal for which the ON-operation time of the standard control signal is reduced by being adjusted with this OFF-operation time.

For example, Japanese Unexamined Patent Publication No. 2011-151918 discloses a motor driving apparatus equipped with a rectifier for converting AC power from a three-phase AC input power supply into DC power and an inverter for converting the DC power into AC power of desired frequency, and configured to perform power regeneration by controlling the rectifier, the motor driving apparatus including: a detection unit configured to detect an input voltage and an input current supplied from the three-phase AC input power supply; an instantaneous effective power calculation unit configured to, based on the input voltage and input current detected by the detection unit, calculate instantaneous effective power supplied from the rectifier to the inverter; a DC component calculation unit configured to, based on the value of the power calculated by the instantaneous effective power calculation unit, calculate a DC component of the effective power supplied from the rectifier to the inverter; and a regenerative operation stopping decision unit configured to compare the value of the DC component, calculated by the DC component calculation unit, with a predetermined threshold value and to decide that a power regeneration operation for feeding regenerative power supplied from the inverter back into the three-phase AC input power supply be stopped when the value of the DC component is greater than the threshold value.

For example, Japanese Unexamined Patent Publication No. 2004-180427 discloses a power regeneration converter including: phase detection means, provided between a three-phase AC power supply and a control apparatus configured to perform variable speed control of a three-phase induction motor, for detecting a voltage phase of the three-phase AC power supply; a regenerative transistor which perform power regeneration to the three-phase AC power supply by switching terminal voltages of a smoothing capacitor that accumulates induced electromotive force created during deceleration of the three-phase induction motor; regenerative signal generation means for generating an ON-OFF control signal for the regenerative transistor, based on a detection signal from the phase detection means; and correction means for monitoring voltage waveforms of the three-phase AC power supply and for correcting a timing of changing the ON-OFF control signal generated by the regenerative signal generation means for the regenerative transistor, upon detecting a shift in a switching timing of phase voltages.

Japanese Unexamined Patent Publication No. 2017-184365 discloses a power conversion device that performs power conversion between an alternating-current source and one of a direct-current load and a direct-current power supply, comprising: an inverter circuit; current detection means for detecting an alternating current in the alternating-current source; a voltage controller that generates a command voltage for the inverter circuit based on an alternating-current signal detected by the current detection means; and a corrector that includes a gain corresponding to a specific frequency and corrects the command voltage based on the alternating-current signal, wherein the corrector is configured to correct the command voltage after the command voltage is output from the voltage controller.

SUMMARY OF INVENTION

In a rectifier that includes a three-phase bridge circuit of which the upper arm and the lower arm for each phase of the three phases are each provided with a power device that includes a rectifying device and a switching device, a current flows, at the time of power running, from the three-phase AC power supply side via the rectifying device in the rectifier to the DC side when the peak value of the input voltage on the three-phase AC power supply side is greater than the DC voltage of the DC side. On the other hand, at the time of regeneration, it is possible to let a current flow from the DC side via switching devices in the rectifier to the three-phase AC power supply side by controlling the ON-OFF operation of the switching devices in the rectifier. In a 120-degree conduction mode rectifier, at the time of switching from the regeneration state to the power running state, an inrush current occurs because the ON-OFF operation of the switching devices halts. The intensity of the inrush current, depends on, for example, impedances of the rectifier and the inverter and the capacitance of the capacitor provided in the DC Link. An occurrence of an inrush current may lead to a problem of breakages of components in the rectifier, the capacitor provided on the DC side of the rectifier, and the like.

Further, in a 120-degree conduction mode rectifier, each switching device is in the ON state for a section of 120 degrees per cycle of the three-phase AC power supply regardless of the magnitude of the regenerative power returned from the DC side to the three-phase AC power supply side during regeneration. When the regenerative power is great, power is steadily returned from the DC side to the three-phase AC power supply side. When the regenerative power is small, however, an excessive regeneration occurs, sharply decreasing the DC voltage of the DC side in the rectifier immediately after the switching to the regeneration state. When an excessive regeneration occurs, the regeneration operation halts, switching back to the power running state, which allows DC voltage to increase again, which in turn starts the regeneration operation again, causing what is called "resonance", in which the regeneration state and the power running state are frequently and repeatedly switched over. The frequency of resonance depends on, for example, impedances of the rectifier and the inverter and the capacitance of the capacitor provided in the DC Link. An occurrence of resonance, with frequent transitions between the regeneration state and the power running state, can cause a problem of abnormal heating of the capacitor and other components provided on the DC side of the rectifier.

Therefore, in a rectifier having a power regeneration function and a motor control apparatus equipped with it, a technology is desired for preventing an inrush current that occurs when the regeneration state switches to the power running state and for preventing resonance in which the regeneration state and the power running state are switched over frequently and repeatedly when the regenerative power is small.

A rectifier according to one aspect of the present disclosure includes: a main circuit unit including a rectifying device and a switching device in reverse-parallel connection with the rectifying device and configured to perform power conversion between AC power on a side of a three-phase AC power supply and DC power on a DC side by rectifying operation of the rectifying device and ON-OFF operation of the switching device; a power calculation unit configured to calculate a value of a power flowing between the side of the three-phase AC power supply and the DC side via the main circuit unit; and a control unit configured to perform control to execute the ON-OFF operation of the switching device, wherein the control unit changes a length of an ON period per cycle in the ON-OFF operation executed on the switching device according to the value of the power calculated by the power calculation unit.

A motor control apparatus according to one aspect of the present disclosure includes: the rectifier; a capacitor provided in a DC Link, which is the DC side of the rectifier; and an inverter connected with the rectifier via the DC Link and configured to convert DC power supplied from the DC Link to AC power for controlling a motor and output the AC power.

BRIEF DESCRIPTION OF THE DRAWINGS

The present invention will be more clearly understood with reference to the following accompanying drawings.

DETAILED DESCRIPTION

Figure 1:
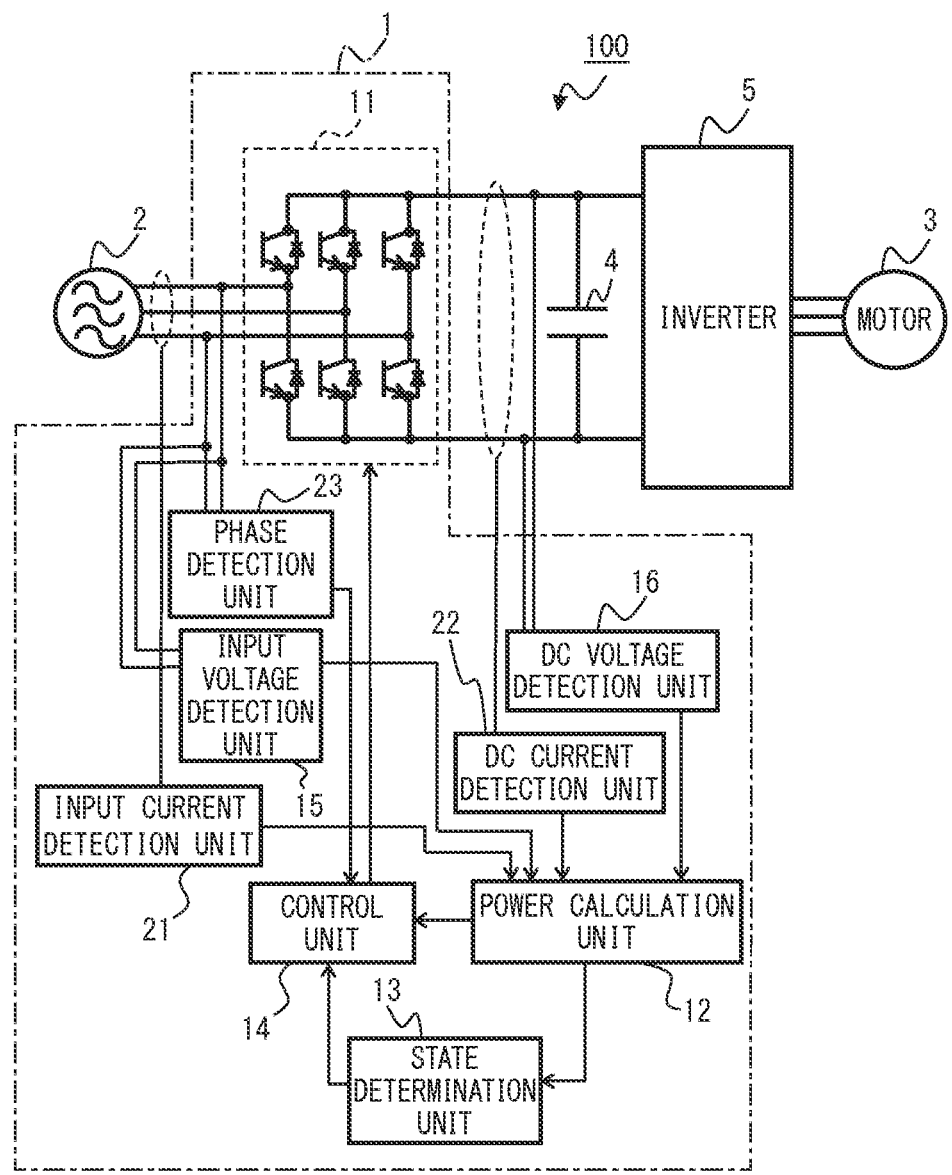
FIG. 1 is a diagram illustrating a rectifier and a motor control apparatus according to one embodiment of the present disclosure.

A rectifier having a power regeneration function and a motor control apparatus equipped with it will be described below with reference to the drawings. To facilitate understanding, the drawings are presented with different scales as appropriate. The embodiments illustrated in the drawings are merely illustrative and the present invention is not limited to the embodiments illustrated in the drawings.

Although a rectifier provided for a motor control apparatus will be described as an example here, the embodiments can be also applied to a case in which the rectifier is provided for a machine other than motor control apparatuses.

FIG. 1 is a diagram illustrating a rectifier and a motor control apparatus according to one embodiment of the present disclosure. Hereafter, it is to be understood that the component features denoted by the same reference signs on different drawings are intended to have the same function.

A case in which a motor control apparatus IOC connected with a three-phase AC power supply 2 controls a motor 3 will be described as an example. The motor 3 is not limited to a particular kind and may be, for example, an induction motor or a synchronous motor. The number of phases of the motor 3 is not limited, either. In FIG. 1, the motor 3 is a three-phase AC motor, as an example. The machinery for which the motor 3 may be provided may be, for example, machine tools, robots, forging machinery, injection molding machines, industrial machinery, transportation machinery, various electric appliances, or the like. The three-phase AC power supply 2 may be, for example, a three-phase 400V AC power supply, three-phase 200V AC power supply, three-phase 600V AC power supply, or the like.

A motor control apparatus 100 according to one embodiment of the present disclosure includes a rectifier 1, a capacitor 4, and an inverter 5.

The rectifier 1 has a power regeneration function and performs power conversion between AC power on the side of the three-phase AC power supply 2 and DC power on the DC side. The details for the configuration and operation of the rectifier 1 will be described later. Note that an electromagnetic contactor and an AC reactor may be provided on the side of the three-phase AC power supply 2 of the rectifier 1, which are not illustrated in the drawing.

A capacitor 4 is provided in a DC Link that connects the DC output side of the rectifier 1 with the DC input side of the inverter 5. The capacitor 4 has functions of accumulating DC power to be used by the inverter 5 for generating AC power and of curtailing pulsation in the DC output of the rectifier 1. The capacitor 4 may be, for example, an electrolytic capacitor, a film capacitor, or the like.

The inverter 5 is connected with the rectifier 1 via the DC link and converts DC power supplied from the DC link to AC power and outputs the AC power for controlling the motor 3. The inverter 5 need only have a configuration to convert DC power to AC current and may be, for example, a PWM inverter with internal switching devices, or the like. The inverter 5 is configured to be a three-phase bridge circuit when the motor 3 is a three-phase AC motor, and configured to be a single-phase bridge circuit when the motor 3 is a single-phase motor. When the inverter 5 is configured to be a PWM inverter, it is configured to be a bridge circuit including rectifying devises and switching devices in reverse-parallel connection therewith. In this case, the switching devices may be, for example, FETs, IGBTs, thyristors, gate turn-off thyristors (GTOs), or bipolar transistors, or may be other semiconductor devices. The speed, the torque, or the position of the rotor of the motor 3 is controlled based on the AC power supplied from the inverter 5. Note that the inverter 5 can convert AC power regenerated by the motor 3 to DC power and return the DC power to the DC link on the DC side by the ON-OFF operation of the switching devices being properly PWM-controlled.

The configuration of the rectifier 1 will be described next.

The rectifier 1 according to one embodiment, of the present disclosure includes a main circuit unit 11, a power calculation unit 12, a state determination unit 13, and a control unit 14. The rectifier 1 further includes an input voltage detection unit 15, a DC voltage detection unit. 16, an input current, detection unit 21, a DC current detection unit 22, and a phase detection unit 23.

The main circuit unit 11 performs power conversion between AC power on the side of the three-phase AC power supply 2 and DC power on the DC side by the rectifying operation of the rectifying devices and the ON-OFF operation of the switching devices. The main circuit unit 11 includes a three-phase bridge circuit of which the upper arm and the lower arm for each phase are each provided with a power device that includes a rectifying device and a switching device in reverse-parallel connection with the rectifying device. The switching devices may be, for example, FETs, IGBTs, thyristors, gate turn-off thyristors (GTOs), or bipolar transistors, or may be other semiconductor devices.

The power device provided for each of the upper arm and the lower arm for each phase of the three phases of the main circuit unit 11 includes a set of a rectifying device, which performs a rectifying function, and a switching device, which performs a power regeneration function. Some arrangements for the power device will be described below. In the example illustrated in FIG. 1, diodes are used for the rectifying devices but, alternatively, switching devices may be used also for the rectifying devices.

Figure 2A:
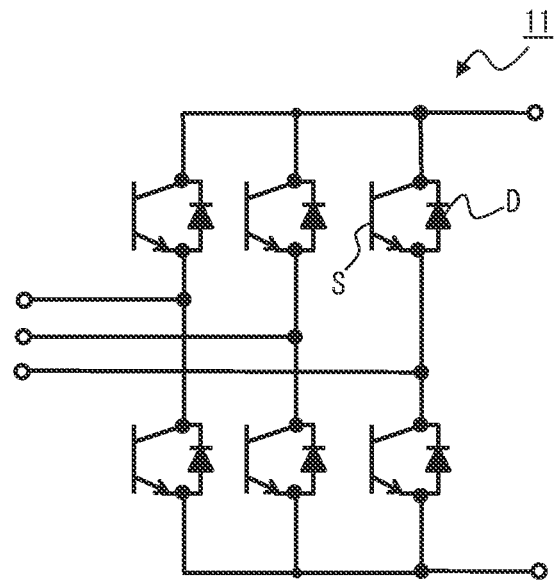
FIG. 2A is a circuit diagram illustrating an example of a main circuit unit including power devices according to a first arrangement, in which the rectifying devices are diodes.
Figure 2B:
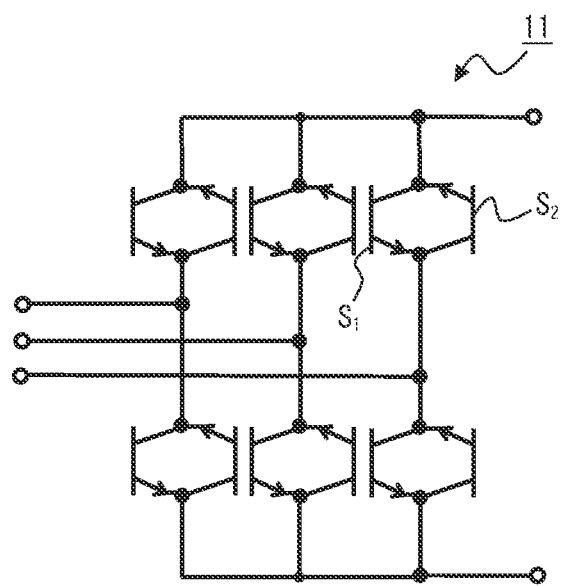
FIG. 2B is a circuit diagram illustrating an example of a main circuit unit in the rectifier, illustrating a main circuit unit including power devices according to a second arrangement, in which the rectifying devices are switching devices.

FIG. 2A is a circuit diagram illustrating an example of a main circuit unit in the rectifier, illustrating a main circuit unit including power devices according to a first arrangement, in which the rectifying devices are diodes. FIG. 2B is a circuit diagram illustrating an example of a main circuit unit in the rectifier, illustrating a main circuit unit including power devices according to a second arrangement, in which the rectifying devices are switching devices;

As illustrated in FIG. 2A, in the first arrangement, in which diodes D are used for the rectifying devices, each switching device S is in reverse-parallel connection with a diode D in such a way that the conducting direction of the switching device 5 in the ON state is in the opposite direction to the conducting direction of the diode D, A power device that includes a set of a switching device S and a diode D is provided for each of the upper arm and the lower arm for each phase of the three phases. In the power running state, AC power on the side of the three-phase AC power supply 2 is converted to DC power and outputted to the DC side by the rectifying operation of the diodes D and, in the regeneration state, DC power on the DC side is converted to AC power and outputted to the side of the three-phase AC power supply 2 by the ON-OFF operation of the switching devices S.

As illustrated in FIG. 2B, in the second arrangement, in which switching device $S_2$ are used for the rectifying devices, each switching device $S_1$ is in reverse-parallel connection with a switching device $S_2$ in such a way that the conducting direction of the switching device $S_1$ in the ON state is in the opposite direction to the conducting direction of the switching device $S_2$ in the ON state. A power device that includes a set of a switching device $S_1$ and a switching device $S_2$ is provided for each of the upper arm and the lower arm for each phase of the three phases. The switching devices $S_1$ perform a power regeneration function and the switching devices $S_2$ perform a rectifying function. In the power running state, AC power on the side of the three-phase AC power supply 2 is converted to DC power and outputted to the DC side by turning on the switching devices $S_2$ all the time and, in the regeneration state, DC power on the DC side is converted to AC power and outputted to the side of the three-phase AC power supply 2 by the ON-OFF operation of the switching devices $S_1$. Thus, the switching devices $S_2$ working as the rectifying devices as illustrated in FIG. 2B are given the function of rectifying devices and are not used for power regeneration. In the present embodiment and in a first and a second modification examples to be described later, the "switching devices" on which ON-OFF operation is executed when the main circuit unit 11 is in the regeneration state or when the main circuit unit is in the power running state and the power value P calculated by the power calculation unit is smaller than a first power threshold value $P_{th1}$ are not the switching devices $S_2$, which perform the rectifying function, but are switching devices $S_1$, which perform the power regeneration function.

With reference to FIG. 1 again, the power calculation unit 12 calculates the power value P flowing between the side of the three-phase AC power supply 2 and the DC side via the main circuit unit 11. Here, for example, the direction of a power flow from the side of the three-phase AC power supply 2 to the DC side via the main circuit unit 11 is defined as the positive direction and the direction of a power flow from the DC side to the side of the three-phase AC power supply 2 via the main circuit unit 11 is defined as the negative direction. Thus, the value of the power calculated by the power calculation unit 12 in the power running state (running power) will be positive and the value of the power calculated by the power calculation unit 12 in the regeneration state (regenerative power) will be negative. Here, some arrangements of the calculation processing by the power calculation unit 12 will be described below.

The power calculation unit 12 in a first arrangement calculates the power value P flowing between the side of the three-phase AC power supply 2 and the DC side via the main circuit unit 11 by multiplying the value of the input voltage by the value of the input current inputted from the side of the three-phase AC power supply 2 to the main circuit unit 11. The value of the input voltage inputted from the side of the three-phase AC power supply 2 to the main circuit unit 11 is detected by the input voltage detection unit 15. The value of the input current inputted from the side of the three-phase AC power supply 2 to the main circuit unit 11 is detected by the input current detection unit 21. The input voltage and the input current are both detected as vectors, and the power value P calculated by the power calculation unit 12 is positive, negative, or zero.

The power calculation unit 12 in a second arrangement calculates the power value P flowing between the side of the three-phase AC power supply 2 and the DC side via the main circuit unit 11 by multiplying the value of the voltage on the DC output side of the main circuit unit 11 by the value of the current outputted from the DC output side of the main circuit unit 11. The value of the voltage on the DC output side of the main circuit unit 11 is detected by the DC voltage detection unit 16. In other words, the DC voltage detection unit 16 detects the value of the potential difference between the positive potential at the positive terminal on the DC output side of the main circuit unit 11 and the negative potential at the negative terminal on the DC output side of the main circuit unit 11 as the value of the voltage on the DC output side of the main circuit unit 11. Alternatively, the DC voltage detection unit 26 may detect the voltage applied between the positive and the negative terminals of the capacitor 4 as the value of the voltage on the DC output side of the main circuit unit 11. The value of the current outputted from the DC output side of the main circuit unit 11 is detected by the DC current, detection unit 22. Here, the direction of a current flow out of the positive terminal into the negative terminal of the DC output side of the main circuit unit 11 is defined as the positive direction. By defining the positivity and negativity of DC voltage and DC current in this way, the value of the power calculated by the power calculation unit 12 is positive, negative, or zero.

Note that the power calculation unit 12 may be implemented either one of the first arrangement or the second arrangement. When the power calculation unit 12 is implemented in the second arrangement, devices provided for the inverter 5 may also be used as the DC voltage detection unit 16 and the DC current detection unit 22.

Based on the power value P calculated by the power calculation unit 12, the state determination unit 13 determines whether the main circuit unit 11 is in the power running state, in which AC power on the side of the three-phase AC power supply 2 is converted to DC power and outputted to the DC side, or in the regeneration state, in which DC power on the DC side is converted to AC power and outputted to the side of the three-phase AC power supply 2. As described above, as an example, the direction of a power flow from the side of the three-phase AC power supply 2 to the DC side via the main circuit unit 11 is defined as the positive direction and the direction of a power flow from the DC side to the side of the three-phase AC power supply 2 via the main circuit unit 11 is defined as the negative direction. Thus, the state determination unit 13 determines that the main circuit unit 11 is in the power running state when the power value P calculated by the power calculation unit 12 is positive and determines that the main circuit unit 11 is in the regeneration state when the power value P calculated by the power calculation unit 12 is negative.

The control unit 14 controls the ON-OFF operation of the switching devices in the main circuit unit 11 according to the result of determination by the state determination unit 13. More specifically, the control unit 14 performs control to execute ON-OFF operation of the switching devices in the main circuit unit 31 either when the state determination unit 13 has determined that the main circuit unit 11 is in the regeneration state or when the state determination unit 13 has determined that the main circuit unit 11 is in the power running state and the power value P calculated by the power calculation unit 32 is smaller than a first power threshold value $P_{th1}$. Further, when the state determination unit 13 has determined that the main circuit unit 11 is in the regeneration state, the control unit 14 determines whether or not to apply the 120-degree conduction mode in controlling the switching devices of the main circuit unit 11 according to whether or not the power value P calculated by the power calculation unit 12 is equal to or smaller than a second power threshold value $P_{th2}$. The details for the operation of the control unit 14 will be described later.

The phase detection unit 23 detects the phase of the voltage in each phase of the three-phase AC power supply 2. The phase of the voltage detected by the phase detection unit 23 is sent to the control unit 14 and used for controlling the switching devices of the main circuit unit 11.

The power calculation unit 12, the state determination unit 13, and the control unit 14 may, for example, be configured with a software program, a combination of various electronic circuits and a software program, or various electronic circuits alone. When, for example, these are configured with a software program, the functions of the above-described units can be implemented, for example, by running an arithmetic processing unit such as DSP or FPGA according to the software program. Alternatively, the power calculation unit 12, the state determination unit 13, and the control unit 14 may be implemented as a semiconductor integrated circuit in which a software program is written for implementing the functions of these units. Alternatively still, the power calculation unit 12, the state determination unit 13, and the control unit 14 may be implemented as a recording medium in which a software program is written for implementing the functions of these units. Further, the power calculation unit 12, the state determination unit 13, and the control unit 14 may be provided, for example, in a numerical control apparatus of a machine tool or may be provided in a robot controller for controlling a robot. Further, the input voltage detection unit 15, the DC voltage detection unit 16, the input current detection unit 21, the DC current detection unit 22, and the phase detection unit 23 may be configured by a combination of an analog circuit and a digital circuit, may be implemented by an arithmetic processing unit constituted with a software program, or may be configured by an analog circuit alone.

Figure 3A:
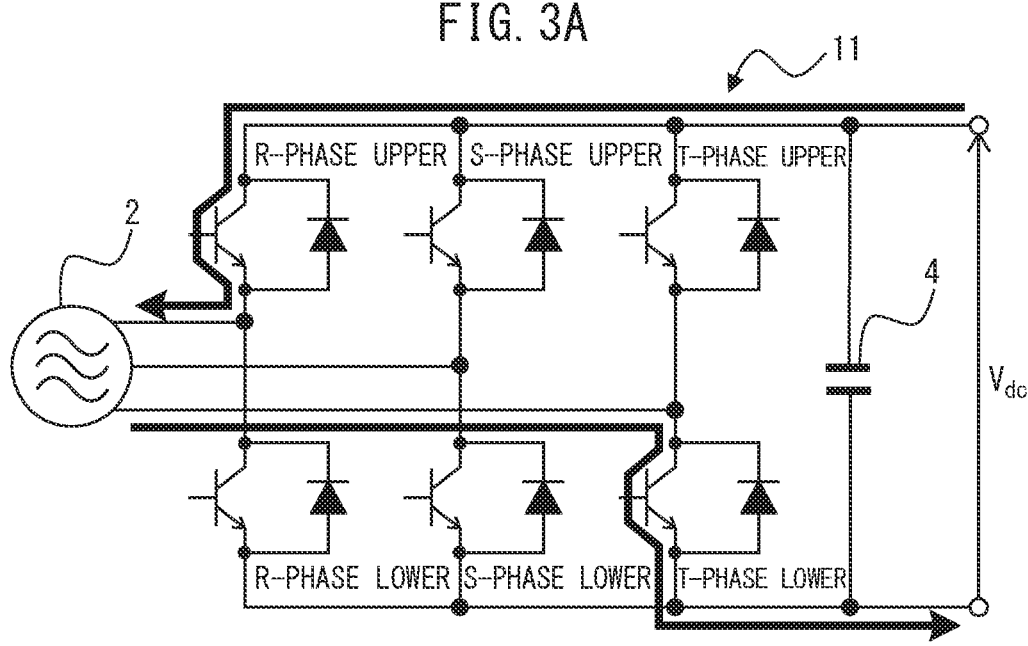
FIG. 3A is a diagram for describing an operation of a rectifier performing power regeneration in a 120-degree conduction mode, illustrating a circuit diagram of a rectifier configured to be a three-phase bridge circuit of power devices.
Figure 3B:
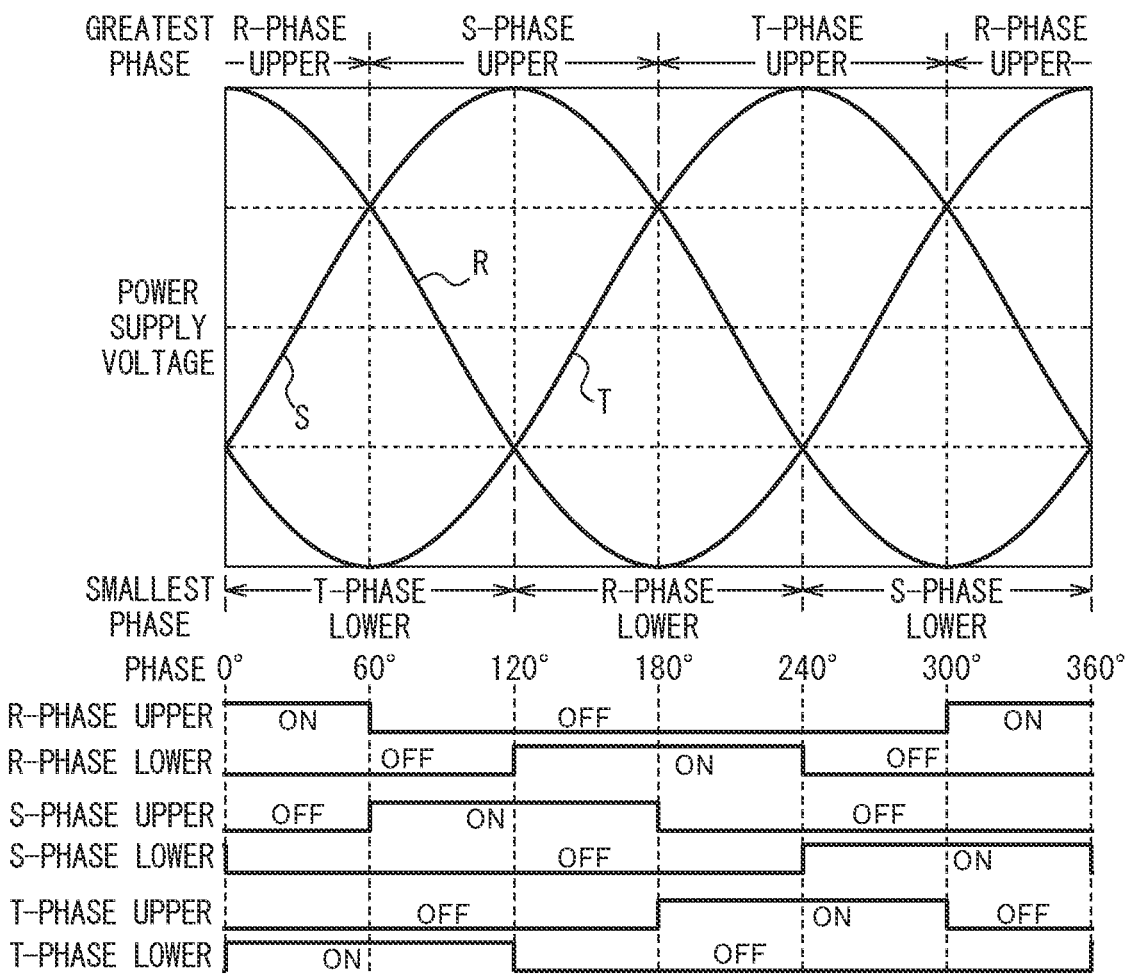
FIG. 3B is a diagram for describing an operation of a rectifier performing power regeneration in a 120-degree conduction mode, illustrating relations between the waveforms of the voltages of a three-phase AC power supply and the on-off operation of switching devices in power devices during power regeneration.

With reference to FIG. 3A and FIG. 3B, the principle of power regeneration in the 120-degree conduction mode will be described next.

FIG. 3A is a diagram for describing an operation of a rectifier performing power regeneration in a 120-degree conduction mode, illustrating a circuit diagram of a rectifier configured to be a three-phase bridge circuit of power devices. FIG. 1B is a diagram for describing an operation of a rectifier performing power regeneration in a 120-degree conduction mode, illustrating relations between the waveforms of the voltages of a three-phase AC power supply and the ON-OFF operation of switching devices in power devices during power regeneration.

As illustrated in FIG. 3A, the main circuit unit 11 of the rectifier 1 includes three legs, i.e., those for R-phase, S-phase, and T-phase. The leg for each phase includes an upper arm and a lower arm. The upper arm and the lower arm are each provided with a power device that includes a rectifying device and a switching device in reverse-parallel connection with the rectifying device. Here, the arms are referred to as the R-phase upper arm, the R-phase lower arm, the S-phase upper arm, the S-phase lower arm, the T-phase upper arm, and the T-phase lower arm. When performing power regeneration in the 120-degree conduction mode, the rectifier 1 detects the phases of the three-phase AC power supply and, with changes in the phase voltages of the three-phase AC power supply, turns on the switching device on the upper arm for a phase in which the voltage is the greatest of the phases of the three-phase AC power supply and turns on the switching device on the lower arm for a phase in which the voltage is the smallest of the phases of the three-phase AC power supply.

As illustrated in FIG. 3B, for example, in the 60-degree phase section in which the R-phase voltage is the greatest and the T-phase voltage is the smallest of the phase voltages of the three-phase AC power supply 2, the switching devices on the R-phase upper arm and the T-phase lower aria are turned on and the switching devices on the other arms are turned off. As a result of this, a current path from the DC side to the side of the three-phase AC power supply 2 is formed, as indicated by the arrow in FIG. 3A, and DC power on the DC side is converted to AC power and returned to the power supply.

Further, for example, in the 60-degree phase section in which the S-phase voltage is the greatest and the T-phase voltage is the smallest of the phase voltages of the three-phase AC power supply 2, the switching devices on the S-phase upper arm and the T-phase lower arm are turned on. In the 60-degree phase section in which the S-phase voltage is the greatest and the R-phase voltage is the smallest of the phase voltages of the three-phase AC power supply 2, the switching devices on the S-phase upper arm and the R-phase lower arm are turned on. In the 60-degree phase section in which the T-phase voltage is the greatest and the R-phase voltage is the smallest of the phase voltages of the three-phase AC power supply 2, the switching devices on the T-phase upper arm and the R-phase lower arm are turned on. In the 60-degree phase section in which the T-phase voltage is the greatest and the S-phase voltage is the smallest of the phase voltages of the three-phase AC power supply 2, the switching devices on the T-phase upper arm and the S-phase lower arm are turned on. In the 60-degree phase section in which the R-phase voltage is the greatest and the S-phase voltage is the smallest of the phase voltages of the three-phase AC power supply 2, the switching devices on the R-phase upper arm and the S-phase lower arm are turned on.

As described above, in the power regeneration in the 120-degree conduction mode, each switching device is in the ON state for a 120-degree phase section per cycle of the three-phase AC power supply 2.

An operation of the rectifier 1 will be described next.

Figure 4A:
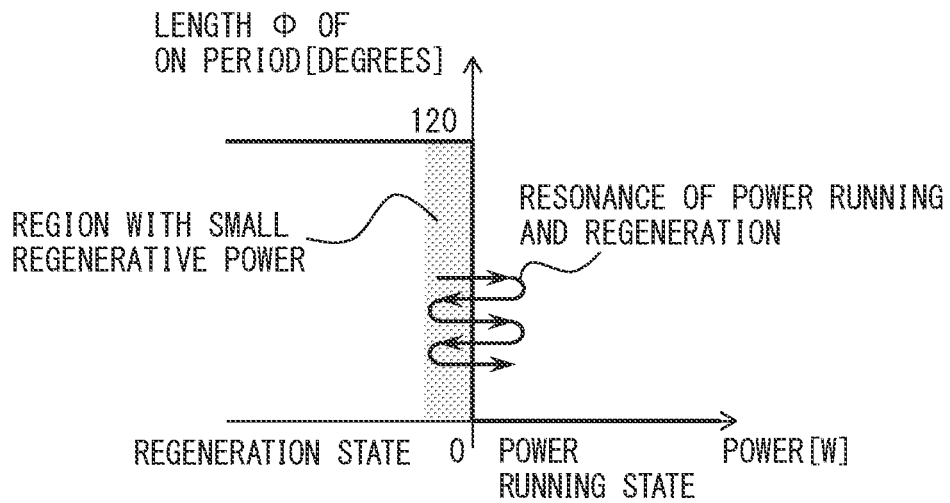
FIG. 4A is a diagram for describing an operation of a rectifier according to one embodiment of the present disclosure, illustrating a resonance, in which the regeneration state and the power running state are switched over frequently and repeatedly when the regenerative power is small.
Figure 4B:
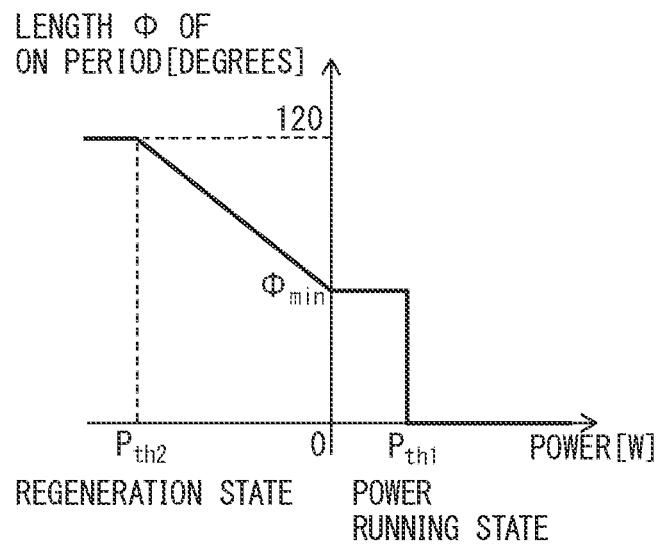
FIG. 4B is a diagram for describing an operation of a rectifier according to one embodiment of the present disclosure, illustrating a first example of changing the length of the ON period per cycle of the switching devices in the rectifier according to one embodiment of the present disclosure.
Figure 4C:
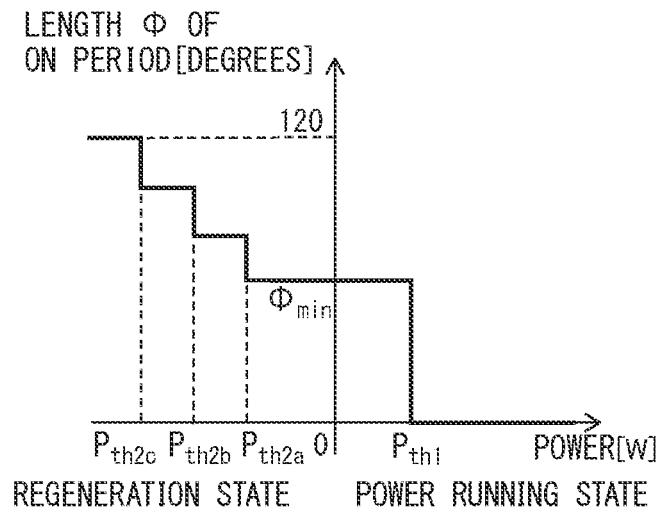
FIG. 4C is a diagram for describing an operation of a rectifier according to one embodiment of the present disclosure, illustrating a second example of changing the length of the ON period per cycle of the switching devices in the rectifier according to one embodiment of the present disclosure.

FIG. 4A is a diagram for describing an operation of a rectifier according to one embodiment of the present disclosure, illustrating a resonance, in which the regeneration state and the power running state are switched over frequently and repeatedly when the regenerative power is small. FIG. 4B is a diagram for describing an operation of a rectifier according to one embodiment of the present disclosure, illustrating a first example of changing the length of the ON period per cycle of the switching devices in the rectifier according to one embodiment of the present disclosure. FIG. 4C is a diagram for describing an operation of a rectifier according to one embodiment of the present disclosure, illustrating a second example of changing the length of the ON period per cycle of the switching devices in the rectifier according to one embodiment of the present disclosure.

As illustrated in FIG. 4A, a conventional 120-degree conduction mode rectifier halts the ON-OFF operation of the switching devices in the rectifier in the power running state and, by the rectifying operation of the diodes, converts AC power on the three-phase AC power supply side to DC power and outputs the DC power to the DC side. In the regeneration state, such a rectifier converts DC power on the DC side to AC power and outputs the AC power to the three-phase AC power supply side by ON-OFF operating the switching devices in the rectifier in the 120-degree conduction mode. In other words, a conventional 120-degree conduction mode rectifier completely halts the ON-OFF operation of the switching devices in the rectifier in the power running state while ON-OFF operating the switching devices in the rectifier in the 120-degree conduction mode in the regeneration state. A conventional 120-degree conduction mode rectifier puts each switching device in the ON state for a 120-degree section per cycle of the three-phase AC power supply at all times, irrespective of the magnitude of the regenerative power returned from the DC side to the three-phase AC power supply side during regeneration. In a region in which the regenerative power is small, an excessive regeneration occurs in which the DC voltage of the DC side of the rectifier sharply decreases immediately after a switch to the regeneration state. When an excessive regeneration occurs, the regeneration operation stops, switching back to the power running state, which increases the DC voltage, which in turn starts a regeneration operation, and thus a resonance occurs, in which the regeneration state and the power running state are switched over frequently and repeatedly. An occurrence of resonance, with frequent transitions between the regeneration state and the power running state, can cause abnormal heating of the capacitor and other components provided on the DC side of the rectifier. Further, when switching from the regeneration state to the power running state, a conventional 120-degree conduction mode rectifier completely halts the ON-OFF operation of the switching devices and this causes an inrush current. An occurrence of inrush current can cause damages on components in the rectifier, the capacitor provided on the DC side of the rectifier, and the like.

In contrast, in the rectifier 1 according to one embodiment of the present disclosure, the control unit 14 performs control to execute ON-OFF operation of the switching devices when the state determination unit 13 has determined that the main circuit unit 11 is in the power running state and the power value P calculated by the power calculation unit 12 is smaller than the first power threshold value $P_{th1}$. The length Φ of the ON period per cycle of the ON-OFF operation executed on the switching devices when the main circuit unit 11 is in the power running state is set at a value smaller than the length of the ON period per cycle in the 120-degree conduction mode (i.e., 120 degrees). In the examples illustrated in FIG. 4B and FIG. 4C, the length Φ of the ON period per cycle when the main circuit unit 11 is in the power running state and the power value P calculated by the power calculation unit 12 is smaller than the first power threshold value $P_{th1}$ is set at a constant value. In an alternative example, the length Φ of the ON period per cycle may be set based on a decreasing function which gives a smaller value as the length Φ of the ON period per cycle for a greater power value P calculated by the power calculation unit 12 (P is a positive value as the main circuit unit 11 is in the power running state). In this alternative example, when the power value P calculated by the power calculation unit 12 is 0 (zero), the length Φ of the ON period per cycle is $Φ_{min}$ and, when the power value P calculated by the power calculation unit 12 coincides the first power threshold value $P_{th1}$, the length Φ of the ON period per-cycle is 0 (zero). As a further alternative example, the length Φ of the ON period per cycle may be stored in a rewritable memory unit (not illustrated) to be rewritable from an external device. In this alternative example, the length Φ of the ON period per cycle can be changed online and real time, for example, during an operation of the rectifier 1 and the motor control apparatus 100.

Note that the first power threshold value $P_{th1}$ may be appropriately set in accordance with the application environment of the rectifier 1 and, to give an example, may be set at about, for example, from several percent to ten and several percent of the rated output power value (positive value) of the rectifier 1 but other values may also be used.

Further, the first power threshold value $P_{th1}$ may be stored in a rewritable memory unit (not illustrated) to be rewritable from an external device, so that, even after being set at a certain value, the first power threshold value $P_{th1}$ can be reset at an appropriate value as necessary. Thus, the rectifier 1 according to one embodiment of the present disclosure curtails the occurrence of an inrush current even in the region in which the running power is small immediately after the switching from the regeneration state to the power running state, by ON-OFF operating the switching devices and thereby securing a current path from the DC side to the side of the three-phase AC power supply 2.

Further, in the rectifier 1 according to one embodiment of the present disclosure, the control unit 14 performs control to execute ON-OFF operation of the switching devices when the state determination unit 13 has determined that the main circuit unit 11 is in the regeneration state. The length $\Phi$ of the ON period per cycle of the ON-OFF operation executed on the switching devices when the main circuit unit 11 is in the regeneration state is changed according to the power value P calculated by the power calculation unit 12. This will be described in further details in the following.

In a case in which the main circuit unit 11 is in the regeneration state, when the power value P calculated by the power calculation unit 12 is greater than the second power threshold value $P_{th2}$, the control unit 14 sets the length $\Phi$ of the ON period per cycle of the ON-OFF operation executed on the switching devices at a value smaller than 120 degrees, i.e., the length of the ON period per cycle in the 120-degree conduction mode, and performs control to execute ON-OFF operation of the switching devices, using this value. In this case, the smaller the absolute value |P| of the power value P calculated by the power calculation unit 12, the smaller value the length $\Phi$ of the ON period per p of the ON-OFF operation executed on the switching devices is set. In a case in which the main circuit unit 11 is in the regeneration state, when the power value P calculated by the power calculation unit 12 is equal to or smaller than the second power threshold value $P_{th2}$, the control unit 14 performs control to execute ON-OFF operation of the switching devices in the 120-degree conduction mode. Mote that the second power threshold value $P_{th2}$ may be appropriately set in accordance with the application environment of the rectifier 1 and, to give an example, may be set at about, for example, from several percent to ten and several percent of the value obtained by adding the minus sign (−) to the rated output power value (positive value) of the rectifier 1 but other values may also be used. Further, the second power threshold value $P_{th2}$ may be stored in a rewritable memory unit (not illustrated) to be rewritable from an external device, so that, even after being set at a certain value, the second power threshold value $P_{th2}$ can be reset at an appropriate value as necessary.

When the main circuit unit 11 is in the regeneration state and the power value P calculated by the power calculation unit 12 is greater than the second power threshold value Pew, the length $\Phi$ of the ON period per cycle of the ON-OFF operation executed on the switching devices is set at a value smaller than 120 degrees, i.e., the length of the ON period per cycle in the 120-degree conduction mode, and the length $\Phi$ of the ON period is set at a smaller value according as the absolute value |P| of the power value P calculated by the power calculation unit 12 is smaller. In other words, in this case, the length $\Phi$ of the ON period per cycle of the ON-OFF operation executed on the switching devices is expressed by a function f(P), where the power value P calculated by the power calculation unit 12 is the variable. The function f(P) expressing the length $\Phi$ of the ON period when the main circuit unit 11 is in the regeneration state and the power value P calculated by the power calculation unit 12 is greater than the second power threshold value $P_{th2}$ needs only be a decreasing function.

As illustrated in FIG. 4B, for example, the length $\Phi$ of the ON period per cycle of the ON-OFF operation executed on the switching devices is set according to a first-degree linear function f(P) that gives a value of 120 degrees when the power value P calculated by the power calculation unit 12 is $P_{th2}$ (a negative value) and gives a value of $\Phi_{min}$ (where $0<\Phi_{min}<120$ degrees) when the power value P calculated by the power calculation unit 12 is 0 (zero). As an example alternative to this, the function f(P) to express the length $\Phi$ of the ON period per cycle may be a decreasing function of a higher degree, a hyperbolic function, or the like, instead of the first-degree linear function illustrated in FIG. 4B, but such a function preferably gives monotonically decreasing values in the section where the power value P calculated by the power calculation unit 12 is from $P_{th2}$ (a negative value) to 0 (zero).

Alternatively still, the length $\Phi$ of the ON period per cycle of the ON-OFF operation executed on the switching devices may be set, as illustrated in FIG. 4C, for example, according to a step function f(P) that gives a smaller value stepwise for the length $\Phi$ of the ON period according as the absolute value |P| of the power value P calculated by the power calculation unit 12 is smaller. In this case, a plurality of power threshold values are provided on the regeneration state side and the length $\Phi$ of the ON period per cycle is determined based on the result of the comparison of the power value P calculated by the power calculation unit 12 with the power threshold values. In the example illustrated in FIG. 4C, three power threshold values, $P_{th2a}$, $P_{th2b}$, and $P_{th2c}$ are provided, for example, and the length $\Phi$ of the ON period is given by a step function f(P) such that $\Phi$ is 120 degrees when the power value P calculated by the power calculation unit 12 is $P_{th2c}$ (a negative value) and that $\Phi$ is $\Phi_{min}$ (where $0<\Phi_{min}<120$ degrees) when the power value P calculated by the power calculation unit 12 is from $P_{th2a}$ to 0 (zero).

Alternatively still, the length $\Phi$ of the OK period per cycle of the ON-OFF operation executed on the switching devices may be set, for example, according to a function f(P) having hysteresis in the increasing and decreasing trends of the regenerative power.

Figure 5A:
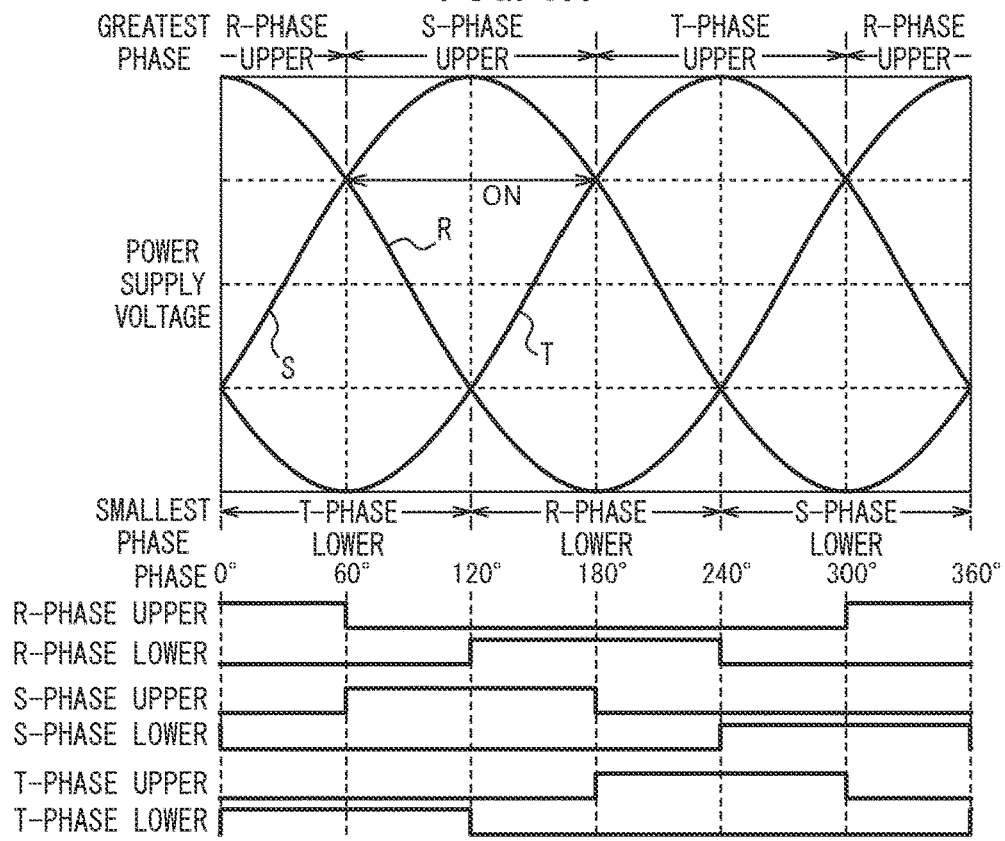
FIG. 5A is a diagram illustrating relations between the waveforms of the voltages of a three-phase AC power supply and the ON-OFF operation of switching devices in power devices in a rectifier 1 according to one embodiment of the present, disclosure, illustrating relations between the waveforms of the voltages of the three-phase AC power supply and the ON-OFF operation of the switching devices in a region with a great regenerative power.
Figure 5B:
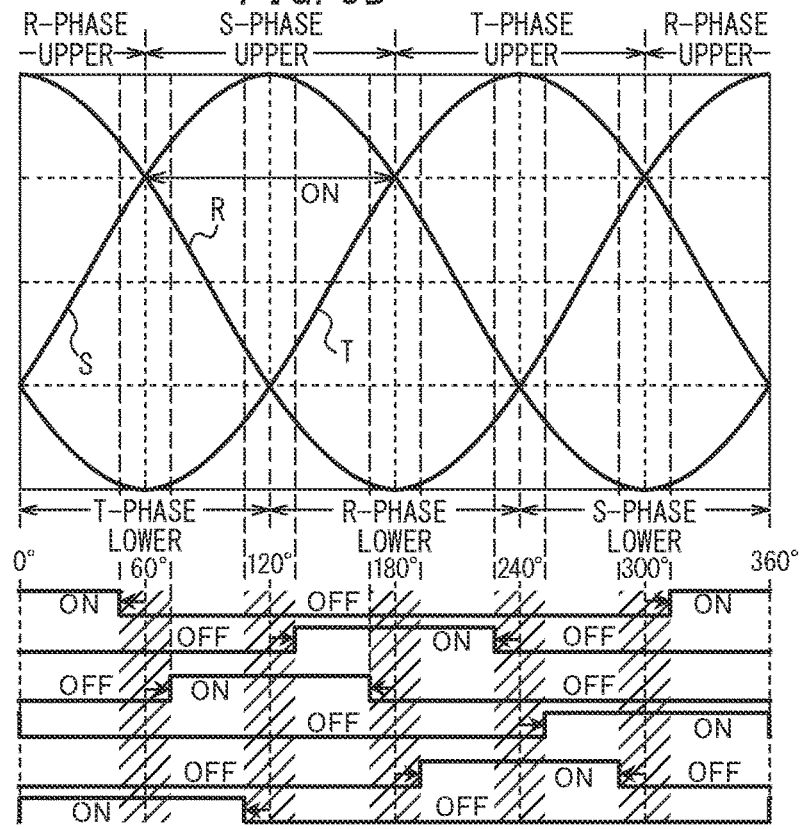
FIG. 5B is a diagram illustrating relations between the waveforms of the voltages of a three-phase AC power supply and the ON-OFF operation of switching devices in power devices in a rectifier 1 according to one embodiment of the present disclosure, illustrating relations between the waveforms of the voltages of the three-phase AC power supply and the ON-OFF operation of the switching devices in a region with a small regenerative power.

FIG. 5A is a diagram illustrating relations between the waveforms of the voltages of a three-phase AC power supply and the ON-OFF operation of switching devices in power devices in a rectifier 1 according to one embodiment of the present disclosure, illustrating relations between the waveforms of the voltages of the three-phase AC power supply and the ON-OFF operation of the switching devices in a region with a great regenerative power. FIG. 5B is a diagram illustrating relations between the waveforms of the voltages of a three-phase AC power supply and the ON-OFF operation of switching devices in power devices in a rectifier 1 according to one embodiment, of the present disclosure, illustrating relations between the waveforms of the voltages of the three-phase AC power supply and the ON-OFF operation of the switching devices in a region with a small regenerative power. In the rectifier 1 according to one embodiment of the present disclosure, as illustrated in FIG. 5A, the control unit 14 performs control to execute ON-OFF operation of the switching devices in the 120-degree conduction mode in the region with a great regenerative power where the power value P calculated by the power calculation unit 12 is equal to or smaller than the second power threshold value $P_{th2}$. Further, in the rectifier 1 according to one embodiment of the present disclosure, as illustrated in FIG. 5B, the control unit 14 performs control to execute the ON-OFF operation of the switching devices with an ON period $\Phi = f(P)$, which is smaller than 120 degrees, i.e., the length of the ON period per cycle in the 120-degree conduction mode, in the region with a small regenerative power where the power value P calculated by the power calculation unit 12 is greater than the second power threshold value $P_{th2}$. The shadowed portions in FIG. 5B indicate the periods in which no switching devices provided on the upper arm or the lower arm for any phase of the three phases is turned on in one voltage cycle of the three-phase AC power supply 2. As illustrated in FIG. 5B, in the region with a small regenerative power, there are always periods in which no switching device provided on the upper arm or the lower arm for any phase of the three phases is turned on in one voltage cycle of the three-phase AC power supply 2 and the power transfer from the DC side to the side of the three-phase AC power supply 2 is shut off in the periods in which no switching device is on. This prevents a resonance, in which the regeneration state and the power running state are switched over frequently and repeatedly, which occurs when the regenerative power is small. Further, an inrush current that can occur at the switching from the regeneration state to the power running state is curtailed even more reliably by setting the length $\Phi_{min}$ of the ON period for the case in which the power value P calculated by the power calculation unit 12 is 0 (zero) at a value equal to the length $\Phi$ of the ON period set for the case in which the main circuit unit 11 has been determined to be in the power running state and the power value P calculated by the power calculation unit 12 is smaller than the first power threshold value $P_{th1}$.

Figure 6:
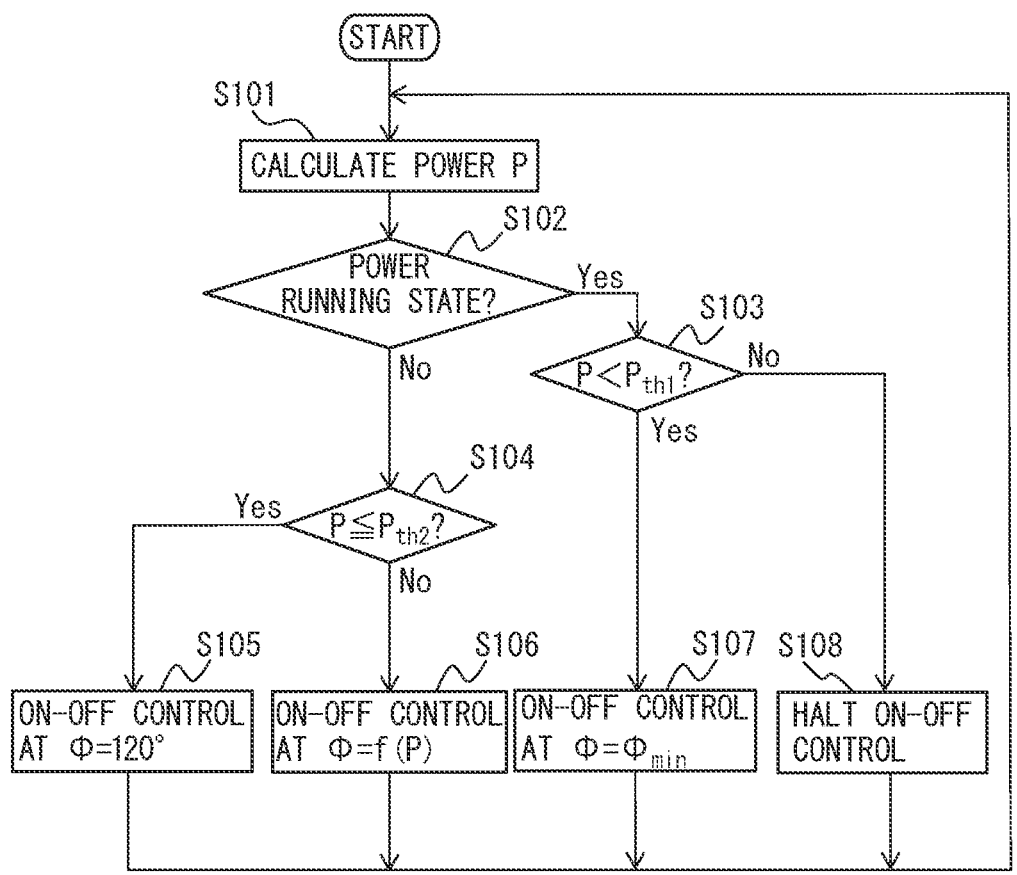
FIG. 6 is a flow chart illustrating an operation flow of a rectifier according to one embodiment of the present disclosure.

FIG. 6 is a flow chart illustrating an operation flow of a rectifier according to one embodiment of the present disclosure.

In Step S101, the power calculation unit 12 calculates the value P of the power that flows between the side of the three-phase AC power supply 2 and the DC side via the main circuit unit 11.

In Step S102, based on the power value P calculated by the power calculation unit 12, the state determination unit 13 determines whether the main circuit unit 11 is in the power running state to convert AC power on the side of the three-phase AC power supply 2 to DC power and output the DC power to the DC side, or in the regeneration state to convert DC power on the DC side to AC power and output the AC power to the side of the three-phase AC power supply 2. When the main circuit unit 11 has been determined to be in the power running state, the process proceeds to Step S103 and, when the main circuit unit 11 has been determined to be in the regeneration state, the process proceeds to Step S104.

In Step S103, the control unit 14 determines whether or not the power value P calculated by the power calculation unit 12 is smaller than the first power threshold value $P_{th1}$. When the power value P calculated by the power calculation unit 12 has been determined to be smaller than the first power threshold value $P_{th1}$, the process proceeds to Step S107 and, when the power value P calculated by the power calculation unit 12 has been determined to be equal to or greater than the first power threshold value $P_{th1}$, the process proceeds to Step S108.

In Step S107, the control unit 14 performs control to execute ON-OFF operation of the switching devices. Here, the length $\Phi$ of the ON period per cycle of the ON-OFF operation executed on the switching devices is set at a value $\Phi_{min}$, which is smaller than the length of the ON period per cycle in the 120-degree conduction mode (i.e., 120 degrees). This prevents the occurrence of an inrush current even in the region in which the running power is small immediately after the switching from the regeneration state to the power running state.

In Step S108, the control unit 14 performs control to halt the execution of the ON-OFF operation of the switching devices. Only the rectifying operation of the rectifying device thus remains and AC power on the side of the three-phase AC power supply 2 is converted to DC power and outputted to the DC side.

When the main circuit unit 11 has been determined to be in the regeneration state in Step S102, the control unit 14 determines whether or not the power value P calculated by the power calculation unit 12 is equal to or smaller than the second power threshold value $P_{th2}$ in Step S104. When the power value P calculated by the power calculation unit 12 has been determined to be equal to or smaller than the second power threshold value $P_{th2}$, the process proceeds to Step S105 and, when the power value P calculated by the power calculation unit 12 has been determined to be greater than the second power threshold value $P_{th2}$, the process proceeds to Step S106.

In Step S105, the control unit 14 performs control to execute ON-OFF operation of the switching devices in the 120-degree conduction mode. DC power on the DC side is thereby converted to AC power and outputted to the side of the three-phase AC power supply 2.

In Step S106, the control unit 14 sets the length $\Phi$ of the ON period per cycle of the ON-OFF operation executed on the switching devices at a value smaller than 120 degrees, i.e., the length of the ON period per cycle in the 120-degree conduction mode, and performs control to execute ON-OFF operation of the switching devices, using this value. In this case, the smaller the absolute value |P| of the power value P calculated by the power calculation unit 12 is, the smaller value the length $\Phi$ of the ON period per cycle of the ON-OFF operation executed on the switching devices is set. This prevents a resonance, in which the regeneration state and the power running state are switched over frequently and repeatedly, even when the regenerative power is small, and DC power on the DC side is converted to AC power and outputted to the side of the three-phase AC power supply 2.

When Steps S105 to S108 are being executed, the power calculation processing in S101 and the determination processing in Steps S102 to S104 are executed in a certain cycle. In FIG. 6, however, it is illustrated for the sake of convenience as if the process returned to S101 after Steps S105 to S108 had been executed.

Next, some modification examples will be described of the technique for determining whether or not to apply the 120-degree conduction mode for controlling the switching devices of the main circuit unit 11 when the main circuit unit 11 is in the regeneration state.

In the embodiment described above, whether or not to apply the 120-degree conduction mode for controlling the switching devices of the main circuit, unit 11 when the main circuit unit 11 is in the regeneration state is determined based on a comparison of the power value P calculated by the power calculation unit 12 with the second power threshold value $P_{th2}$. In a first modification example, instead of the comparison of the power value P calculated by the power calculation unit 12 with the second power threshold value $P_{th2}$, the control unit 14 determines whether or not to apply the 120-degree conduction mode for controlling the switching devices of the main circuit unit 11 when the main circuit unit 11 is in the regeneration state, based on the peak value of the input voltage inputted from the side of the three-phase AC power supply 2 to the main circuit unit 11 and the DC voltage value on the DC side of the main circuit unit 11.

Figure 7:
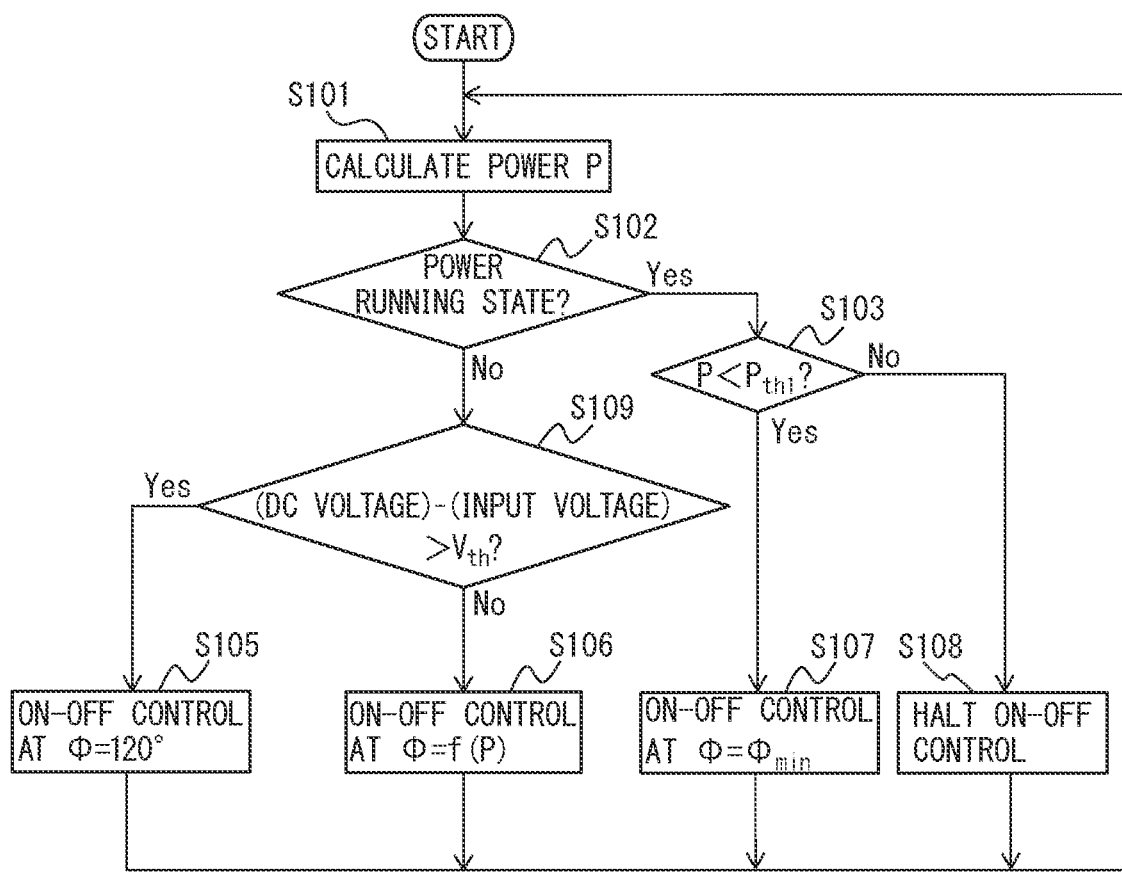
FIG. 7 is a flow chart illustrating an operation flow of a rectifier according to a first modification example of one embodiment, of the present disclosure.

FIG. 7 is a flow chart, illustrating an operation flow of a rectifier according to a first modification example of one embodiment, of the present disclosure.

The processing in Steps S101 to S103 and S105 to S108 illustrated in FIG. 7 is the same as the processing in Steps S101 to S103 and S105 to S108 illustrated in FIG. 6. However, when the main circuit unit 11 has been determined to be in the regeneration state in Step S102, the process proceeds to Step S109.

In Step S109, the control unit 14 determines whether or not the difference between the DC voltage value on the DC side of the main circuit, unit 11 and the peak value of the input voltage is greater than a voltage threshold value $V_{th}$. The DC voltage value on the DC side of the main circuit unit 11 is detected by the DC voltage detection unit 16 and the peak value of the input voltage inputted from the side of the three-phase AC power supply 2 to the main circuit unit 11 is detected by the input voltage detection unit 15. Note that, in FIG. 1, the arrows from the input voltage detection unit 15 and the DC voltage detection unit 16 to the control unit 14 are omitted. The voltage threshold value $V_{th}$ may be appropriately set in accordance with the application environment of the rectifier 1 and, to give an example, may be set at about, for example, from ten and several percent to several tens of percent of the rated output voltage value of the rectifier 1 but other values may also be used. Note that the voltage threshold value $V_{th}$ may be stored in a rewritable memory unit (not illustrated) to be rewritable from an external device, so that, even after being set at a certain value, the voltage threshold value $V_{th}$ can be reset at an appropriate value as necessary. When the difference between the DC voltage value on the DC side of the main circuit unit 11 and the peak value of the input voltage has been determined to be greater than the voltage threshold value $V_{th}$ in Step S109, the process proceeds to Step S105 and, when difference between the DC voltage value on the DC side of the main circuit unit 11 and the peak value of the input voltage has been determined to be equal to or smaller than the voltage threshold value $V_{th}$, the process proceeds to Step S106.

In Step S105, the control unit 14 performs control to execute ON-OFF operation of the switching devices in the 120-degree conduction mode. DC power on the DC side is thereby converted to AC power and outputted to the side of the three-phase AC power supply 2.

In Step S106, the control unit 14 sets the length $\Phi$ of the ON period per cycle of the ON-OFF operation executed on the switching devices at a value smaller than 120 degrees, i.e., the length of the ON period per cycle in the 120-degree conduction mode, and performs control to execute ON-OFF operation of the switching devices, using this value. In this case, the smaller the absolute value |P| of the power value P calculated by the power calculation unit 12 is, the smaller value the length $\Phi$ of the ON period per cycle of the ON-OFF operation executed on the switching devices is set.

In a second modification example of the rectifier 1 according to one embodiment of the present disclosure, instead of the comparison of the power value P calculated by the power calculation unit 12 with the second power threshold value $P_{th2}$, the control unit 14 determines whether or not to apply the 120-degree conduction mode for controlling the switching devices of the main circuit unit 11, based on a comparison of the count of the number of times the regeneration state and the power running state have switched over in a predefined time period since the state determination unit 13 determined that the main circuit unit 11 was in the regeneration state with a count threshold value $C_{th}$.

Figure 8:
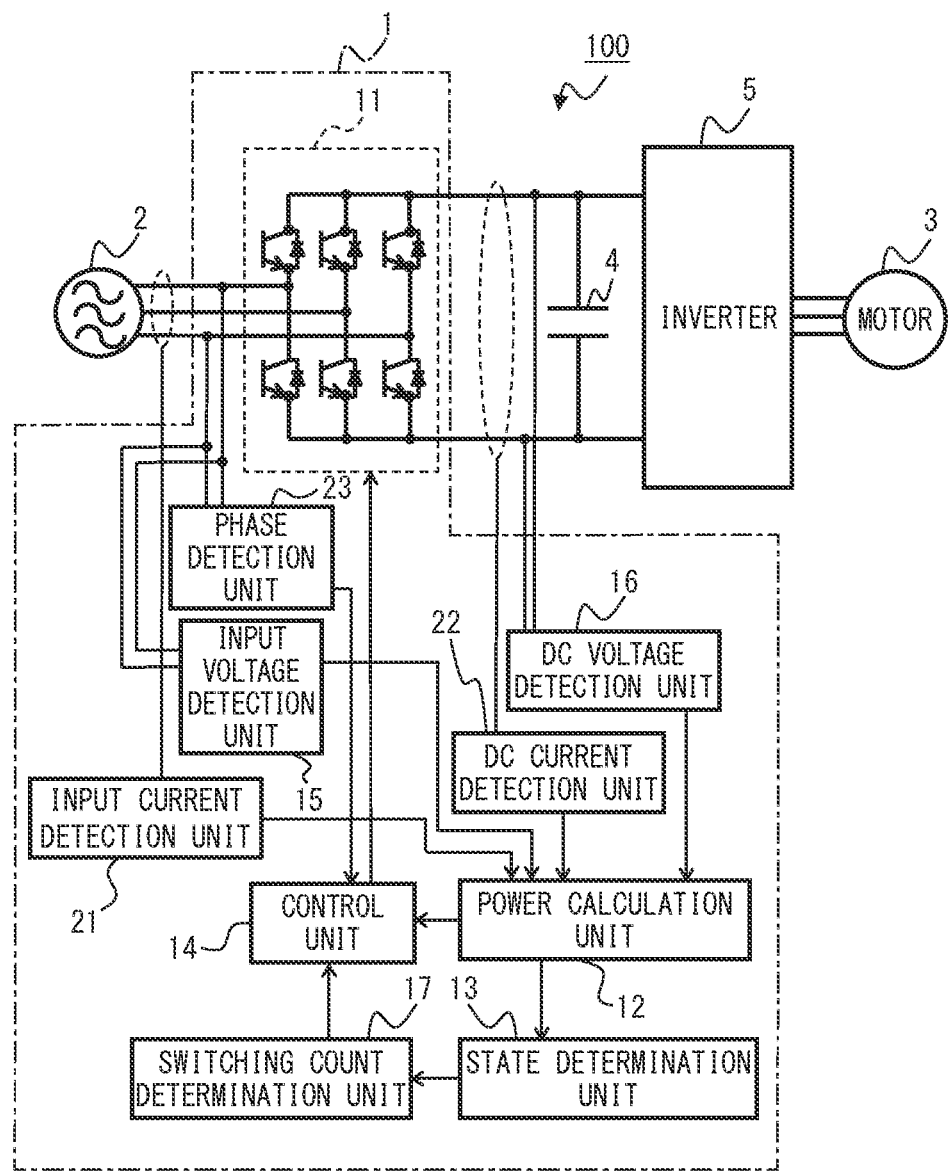
FIG. 8 is a diagram illustrating a rectifier and a motor control apparatus according to a second modification example of one embodiment of the present disclosure.

FIG. 8 is a diagram illustrating a rectifier and a motor control apparatus according to a second modification example of one embodiment of the present disclosure.

As illustrated in FIG. 8, the rectifier 1 according to a second modification example of one embodiment of the present disclosure includes, in addition to the components of the rectifier 1 illustrated in FIG. 1, a switching count determination unit 17.

Based on the result of determination by the state determination unit 13, the switching count determination unit 17 determines whether or not the count of the number of times the regeneration state and the power running state have switched over in a predefined time period since the state determination unit 13 determined that the main circuit unit 11 was in the regeneration state is equal to or greater than the count threshold value $C_{th}$. The result of determination by the switching count determination unit 17 is communicated to the control unit 14. The "predefined time period" may be appropriately set in accordance with the application environment of the rectifier 1 and, to give an example, may be set at about, for example, several seconds, but other values may also be used. Note that the count threshold value $C_{th}$ and the "predefined time period" may be stored in a rewritable memory unit (not illustrated) to be rewritable from an external device, so that, even after being set at certain values, count threshold value $C_{th}$ and the "predefined time period" can be reset, at appropriate values as necessary.

The control unit 14 sets the length of the ON period per cycle of the ON-OFF operation executed on the switching devices at a value smaller than the length of the ON period per cycle in the 120-degree conduction mode when the switching count determination unit 17 has determined that the count of the number of times the regeneration state and the power running state have switched over in the predefined time period is equal to or greater than the count threshold value $C_{th}$ and performs control to execute ON-OFF operation of the switching devices, using this value. In this case, the smaller the absolute value |P| of the power value P calculated by the power calculation unit 12 is, the smaller value the length $\Phi$ of the ON period per cycle of the ON-OFF operation executed on the switching devices may be set.

The control unit 14 performs control to execute ON-OFF operation of the switching devices in the 120-degree conduction mode when the switching count determination unit 17 has not determined that the count of the number of times the regeneration state and the power running state have switched over in the predefined time period is equal to or greater than the count threshold value $C_{th}$. Note that the count threshold value $C_{th}$ may be appropriately set in accordance with the application environment of the rectifier 1 and, to give an example, may be set at about several times but other values may also be used. A smaller count threshold value $C_{th}$ will more effectively curtail abnormal heating of the capacitor from being caused by resonance, in which the regeneration state and the power running state are switched over frequently and repeatedly.

In the second modification example, the circuit components are the same as the circuit components illustrated in FIG. 1 except for the switching count determination unit 17 and the control unit 14, and so identical circuit components are denoted by identical reference signs and will not be described in detail.

The switching count determination unit 17 may, for example, be configured with a software program, a combination of various electronic circuits and a software program, or various electronic circuits alone. When, for example, the unit is configured with a software program, the function of the unit can be implemented, for example, by running an arithmetic processing unit such as DSP or FPGA according to the software program. Alternatively, the switching count determination unit 17 may be implemented as a semiconductor integrated circuit in which a software program is written for implementing the function of the unit. Alternatively still, the switching count determination unit 17 may be implemented as a recording medium in which a software program is written for implementing the function of the unit. Further, the switching count determination unit 17 may be provided, for example, in a numerical control apparatus of a machine tool or may be provided in a robot controller for controlling a robot.

Figure 9:
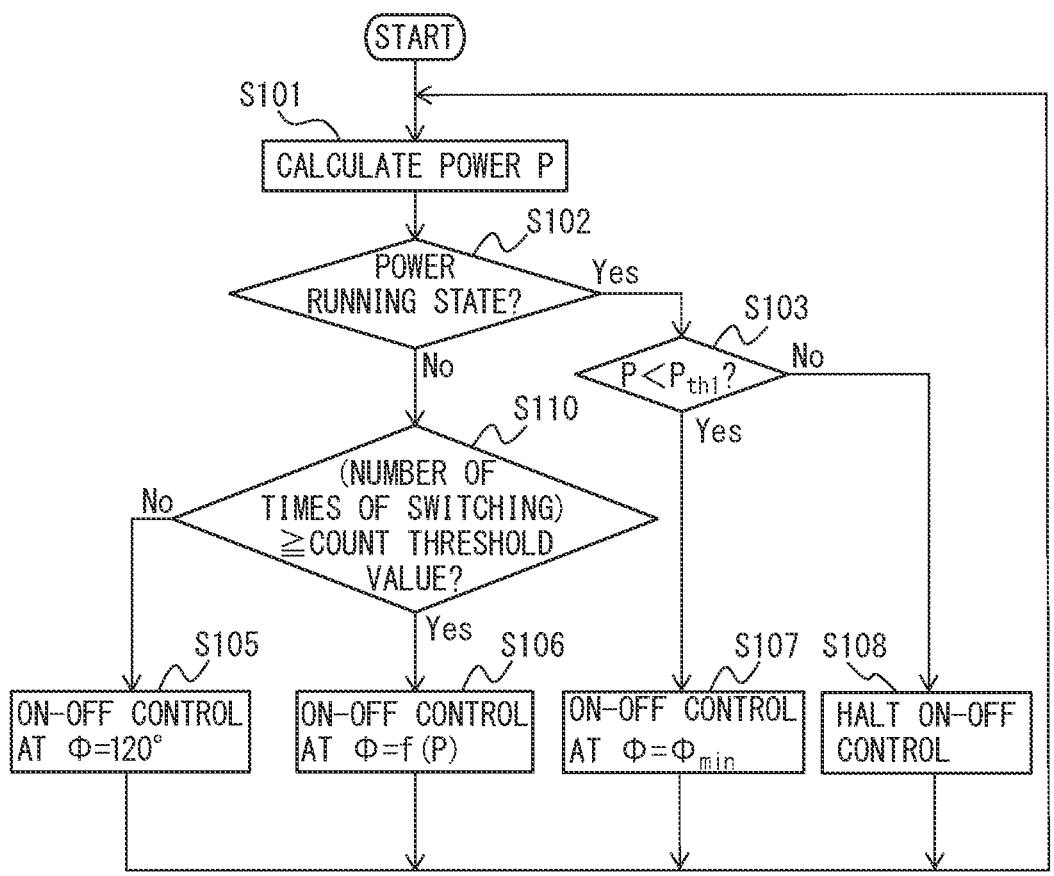
FIG. 9 is a flow chart illustrating an operation flow of a rectifier according to the second modification example of one embodiment of the present disclosure.

FIG. 9 is a flow chart illustrating an operation flow of a rectifier according to a second modification example of one embodiment of the present disclosure.

The processing in Steps S101 to S103 and S105 to S108 illustrated in FIG. 9 is the same as the processing in Steps S101 to S103 and S105 to S106 illustrated in FIG. 6. However, when the main circuit unit 11 has been determined to be in the regeneration state in Step S102, the process proceeds to Step S110.

Based on the result of determination by the state determination unit 13, the switching count determination unit 17 determines in Step S110 whether or not the count of the number of times the regeneration state and the power running state have switched over in a predefined time period since the state determination unit 13 determined that the main circuit unit 11 was in the regeneration state is equal to or greater than the count, threshold value $C_{th}$. In Step S110, when it has not been determined that the count of the number of times the regeneration state and the power running state have switched over in a predefined time period is equal to or greater than the count threshold value $C_{th}$, the process proceeds to Step S105 and, when it has been determined that the count, of the number of times the regeneration state and the power running state have switched over in a predefined time period is equal to or greater than the count threshold value $C_{th}$, the process proceeds to Step S106.

In Step S105, the control unit 14 performs control to execute ON-OFF operation of the switching devices in the 120-degree conduction mode. DC power on the DC side is thereby converted to AC power and outputted to the side of the three-phase AC power supply 2.

In Step S106, the control unit 14 sets the length Φ of the ON period per cycle of the ON-OFF operation executed on the switching devices at a value smaller than 120 degrees, i.e., the length of the ON period per cycle in the 120-degree conduction mode, and performs control to execute ON-OFF operation of the switching devices, using this value. In this case, the smaller the absolute value |P| of the power value P calculated by the power calculation unit 12 is, the smaller value the length Φ of the ON period per cycle of the ON-OFF operation executed on the switching devices is set.

As described above, also in both of the first modification example and the second modification example, when the power value P calculated by the power calculation unit 12 has been determined to be smaller than the first power threshold value $P_{th1}$ in Step S103, the control unit 14 performs control in Step S107 to execute ON-OFF operation of the switching devices; hence no inrush current occurs even in the region in which the running power is small immediately after the switching from the regeneration state to the power running state. Further, based on the result of determination in Step S109 of the first modification example and in Step S110 of the second modification example, the ON-OFF operation of the switching devices are controlled to prevent resonance, in which the regeneration state and the power running state are switched over frequently and repeatedly; hence there will be no abnormal heating of the capacitor.

According to one aspect of the present disclosure, a rectifier having a power regeneration function and a motor control apparatus equipped therewith prevent an inrush current that occurs when the regeneration state switches to the power running state, and resonance in which the regeneration state and the power running state are switched over frequently and repeatedly when the regenerative power is small.

The invention claimed is:

1. A rectifier comprising:
   a main circuit unit configured to perform power conversion between AC power on a side of a three-phase AC power supply and DC power on a DC side by rectifying operation of a rectifying device and ON-OFF operation of a switching device;
   a power calculation unit configured to calculate a value of a power flowing between the side of the three-phase AC power supply and the DC side via the main circuit unit;
   a control unit configured to perform control to execute the ON-OFF operation of the switching device; and
   a state determination unit configured to determine, based on the value of the power calculated by the power calculation unit, whether the main circuit unit is in a power running state, in which AC power on the side of the three-phase AC power supply is converted to DC power and outputted to the DC side, or in a regeneration state, in which DC power on the DC side is converted to AC power and outputted to the side of the three-phase AC power supply,
   wherein the control unit changes the length of the ON period per cycle in the ON-OFF operation executed on the switching device according to the value of the power calculated by the power calculation unit when the state determination unit has determined that the main circuit unit is in the regeneration state, and
   wherein the control unit changes the length of the ON period per cycle in the ON-OFF operation executed on the switching device according to the value of the power calculated by the power calculation unit when the state determination unit has determined that the main circuit unit is in the power running state and the value of the power calculated by the power calculation unit is smaller than a first power threshold value.

2. The rectifier according to claim 1, wherein control unit performs control to halt the execution of the ON-OFF operation of the switching device when the state determination unit has determined that the main circuit unit is in the power running state and the value of the power calculated by the power calculation unit is equal to or greater than the first power threshold value.

3. The rectifier according to claim 1, wherein the main circuit unit comprises a three-phase bridge circuit of which an upper arm and a lower arm for each phase are each provided with a power device that comprises the rectifying device and the switching device in reverse-parallel connection with the rectifying device.

4. The rectifier according to claim 3, wherein,
when the state determination unit has determined that the main circuit unit is in the regeneration state and the value of the power calculated by the power calculation unit is equal to or smaller than a second power threshold value, the control unit performs control to execute the ON-OFF operation of the switching devices in a 120-degree conduction mode, in which, with changes in voltages in the phases, the control unit turns on the switching device on the upper arm for a phase in which the voltage is the greatest of the phases of the three-phase AC power supply, and turns on the switching device on the lower arm for a phase in which the voltage is the smallest of the phases of the three-phase AC power supply, and
when the state determination unit has determined that the main circuit unit is in the regeneration state and the value of the power calculated by the power calculation unit is greater than the second power threshold value, the control unit sets the length of the ON period per cycle in the ON-OFF operation executed on the switching devices at a value smaller than the length of the ON period per cycle in the 120-degree conduction mode.

5. The rectifier according to claim 4, wherein, when the state determination unit has determined that the main circuit unit is in the regeneration state and the value of the power calculated by the power calculation unit is greater than the second power threshold value, the control unit sets the length of the ON period per cycle in the ON-OFF operation executed on the switching devices at a smaller value according as the absolute value of the value of the power calculated by the power calculation unit is smaller.

6. The rectifier according to claim 3, further comprising:
an input voltage detection unit configured to detect a peak value of an input voltage inputted from the side of the three-phase AC power supply to the main circuit unit; and
a DC voltage detection unit configured to detect a DC voltage value on the DC side of the main circuit unit, wherein,
when the state determination unit has determined that the main circuit unit is in the regeneration state and a difference between the DC voltage and the peak value of the input voltage is greater than a voltage threshold value, the control unit performs control to execute the ON-OFF operation of the switching devices in a 120-degree conduction mode, in which, with changes in voltages in the phases, the control unit turns on the switching device on the upper arm for a phase in which the voltage is the greatest of the phases of the three-phase AC power supply, and turns on the switching device on the lower arm for a phase in which the voltage is the smallest of the phases of the three-phase AC power supply, and
when the state determination unit has determined that the main circuit unit is in the regeneration state and the difference between the DC voltage and the peak value of the input voltage is equal to or smaller than the voltage threshold value, the control unit sets the length of the ON period per cycle in the ON-OFF operation executed on the switching devices at a value smaller than the length of the ON period per cycle in the 120-degree conduction mode.

7. The rectifier according to claim 6, wherein, when the state determination unit has determined that the main circuit unit is in the regeneration state and the difference between the DC voltage and the peak value of the input voltage is equal to or smaller than the voltage threshold value, the control unit sets the length of the ON period per cycle in the ON-OFF operation executed on the switching devices at a smaller value according as the absolute value of the value of the power calculated by the power calculation unit is smaller.

8. A motor control apparatus comprising:
a rectifier according to claim 1;
a capacitor provided in a DC Link, which is the DC side of the rectifier; and
an inverter connected with the rectifier via the DC Link and configured to convert DC power supplied from the DC Link to AC power for controlling a motor and output the AC power.

* * * * *